(12) United States Patent
Yamada et al.

(10) Patent No.: US 8,020,932 B2
(45) Date of Patent: Sep. 20, 2011

(54) VEHICLE SEAT

(75) Inventors: Takuro Yamada, Tochigi (JP); Kazuyuki Kaneko, Wako (JP)

(73) Assignees: TS TECH Co., Ltd., Saitama (JP); HONDA MOTOR Co., Ltd., Tokyo (JP)

( * ) Notice: Subject to any disclaimer, the term of this patent is extended or adjusted under 35 U.S.C. 154(b) by 178 days.

(21) Appl. No.: 12/443,239

(22) PCT Filed: Sep. 26, 2007

(86) PCT No.: PCT/JP2007/069323
§ 371 (c)(1),
(2), (4) Date: May 29, 2009

(87) PCT Pub. No.: WO2008/044558
PCT Pub. Date: Apr. 17, 2008

(65) Prior Publication Data
US 2010/0007188 A1    Jan. 14, 2010

(30) Foreign Application Priority Data
Sep. 27, 2006   (JP) ................. 2006-262652

(51) Int. Cl.
*A47C 15/00* (2006.01)
(52) U.S. Cl. ...................... 297/257; 297/248
(58) Field of Classification Search ............ 297/248, 297/257
See application file for complete search history.

(56) References Cited

U.S. PATENT DOCUMENTS

| | | | |
|---|---|---|---|
| 5,594,139 A * | 1/1997 | Varney et al. | 544/48 |
| 6,260,924 B1 * | 7/2001 | Jones et al. | 297/452.18 |
| 7,377,586 B2 * | 5/2008 | Evans | 297/248 |

FOREIGN PATENT DOCUMENTS

| | | |
|---|---|---|
| JP | 2000108737 | 4/2000 |
| JP | 2001301496 | 10/2001 |
| JP | 2001319667 | 11/2001 |
| JP | 2003118457 | 4/2003 |
| JP | 2005080864 | 3/2005 |

OTHER PUBLICATIONS

Intl. Appln. No. PCT/JP2007//069323, International Search Report, Jan. 22, 2008.

* cited by examiner

*Primary Examiner* — Sarah B McPartlin
(74) *Attorney, Agent, or Firm* — Dann, Dorfman, Herrell and Skillman, P.C.

(57) ABSTRACT

A vehicle seat is disclosed which comprises a seat cushion (1), first and second seat backs (2, 3) separated from each other in a vehicle width direction and pivotally supported to the seat cushion (1), a first recliner device (22) for allowing the first seat back (2) to be pivoted in a forward/rearward direction with respect to the seat cushion (1), and a second recliner device (34) for allowing the second seat back (3) to be pivoted in the forward/rearward direction with respect to the seat cushion (1).

4 Claims, 3 Drawing Sheets

VEHICLE SEAT

TECHNICAL FIELD

The present invention relates to a vehicle seat which includes two seat backs separated from each other in a vehicle width direction and supported to a seat cushion of the vehicle seat through recliner devices so as to be pivotable forward and rearward with respect to the seat cushion.

BACKGROUND ART

Generally, in a vehicle such as a wagon car, a three-passenger seat which includes a center seat section provided between left and right seat sections is installed as a rear seat such as a second seat or a third seat. In this three-passenger seat, the respective seat sections are formed independently from one another, provided with recliner devices, and configured so as to be pivotable forward and rearward through the recliner devices (Japanese Patent Application Laid-Open Nos. 2001-301496 and 2001-310667).

When the seat sections of the three-passenger seat are formed independently from one another, the recliner devices are required to be provided at both sides of each of the seat sections and brackets between which the recliner devices are arranged interposedly are also required to be provided at seat cushions and seat backs of the three-passenger seat, so that an effective sitting-space for a passenger in each seat section which is measured in a vehicle width direction is inevitably made relatively narrow.

In lieu of the related art seat which has been discussed above, there may be proposed a vehicle seat which includes a single seat cushion and two seat backs separated from each other in a vehicle width direction and supported to the single seat cushion through recliner devices so as to be independently pivotable forward and rearward with respect to the seat cushion.

Even in the case where the two seat backs are supported to the single seat cushion so as to be independently pivotable, when the recliner devices are provided at both sides of each seat back, brackets between which the recliner devices are arranged interposedly are required to be provided at the seat cushion and the seat backs, so that effective sitting-spaces for passengers which are enough in the vehicle width direction cannot be obtained.

DISCLOSURE OF THE INVENTION

It is therefore an object of the present invention to provide a vehicle seat which includes two seat backs separated from each other in a vehicle width direction, allows effective sitting-spaces for passengers to be obtained in the vehicle width direction with a simple structure, and can realize weight-lightening of the entire vehicle seat.

In accordance with the present invention, there is provided a vehicle seat which comprises a seat cushion, first and second seat backs separated from each other in a vehicle width direction and pivotally supported to the seat cushion, the first seat back being provided at a side thereof adjacent the side of said second seat back with a first bracket, the second seat back being provided at a side thereof adjacent the side of the first seat back with a second bracket, the seat cushion being provided with a third bracket which is located between the first bracket of the first seat back and the second bracket of the second seat back and rises up from a rear end portion of the seat cushion, a first recliner device for allowing the first seat back to be pivoted in a forward/rearward direction with respect to the seat cushion, the first recliner device including an actuating shaft, the first recliner device being arranged interposedly between the first bracket of the first seat back and the third bracket of the seat cushion with both end portions of the actuating shaft being penetrated through the first and third brackets and rotatably supported to the first and third brackets, the third bracket of the seat cushion being provided with a support pin, the support pin being provided at the third bracket so as to be laterally projected toward the second seat back from the third bracket and coaxially surrounding one of the end portions of the actuating shaft which is penetrated through the third bracket of the seat cushion, the support pin being penetrated through the second bracket of the second seat back and supported to the second bracket, and a second recliner device for allowing the second seat back to be pivoted in the forward/rearward direction with respect to the seat cushion, the second recliner device being provided at a side of the second seat back which is remote from the first seat back, so that the second seat back is pivotally supported to the seat cushion so as to be pivotable around the support pin through the second recliner device.

In a preferred embodiment of the present invention, the third bracket of the seat cushion has a stopper portion rising up from a rear region of an upper surface thereof and the first bracket of the first seat back has an abutment piece projecting laterally therefrom. In this case, when the first seat back is pivoted rearward, the abutment piece is abutted against the stopper portion, to thereby restrict a standing-up posture of the first seat back with respect to the seat cushion.

Moreover, in a preferred embodiment of the present invention, the support pin has a large diameter root portion and a hole formed in the large diameter root portion, the end portion of the actuating shaft of the first recliner device being rotatably received in the hole.

Moreover, in a preferred embodiment of the present invention, the second seat back has a main frame which includes a pair of vertical frame sections and a lower frame section connected between lower end portions of the vertical frame sections, and the second bracket of the second seat back includes a support portion having a hole through which the support pin is inserted, and arm portions extending from the support portion and fixed to one of the vertical frame sections and the lower frame section.

According to the present invention, the support pin is provided at the third bracket of the seat cushion so as to coaxially surround the end portion of the actuating shaft of the first recliner device, which is penetrated through the third bracket of the seat cushion, and so as to be projected toward the second seat back from the third bracket of the seat cushion. The support pin of the third bracket is penetrated through the second bracket of the second seat back and supported to it. The second recliner device is provided at the side of the second seat back which is remote from the first seat back. Thus, the second seat back is supported to the seat cushion so as to be pivotable forward and rearward around the support pin through the second recliner device, so that an additional recliner device is not required to be provided between the third bracket of the seat cushion and the second bracket of the second seat back. Moreover, a special bracket for the additional recliner device is not required to be provided at the seat cushion and installment spaces for the additional recliner device and the special bracket are not required. Therefore, effective sitting-spaces for passengers can be obtained in the vehicle width direction and weight-lightening of the entire seat can be realized.

In addition, the side of the second seat back at which any recliner device is not provided is supported by the support pin which is penetrated through the second bracket of the second seat back, so that the second seat back can be brought to a condition where it is stably pivotable, by the second recliner device.

DETAILED DESCRIPTION OF THE PREFERRED EMBODIMENTS

Figure 1:
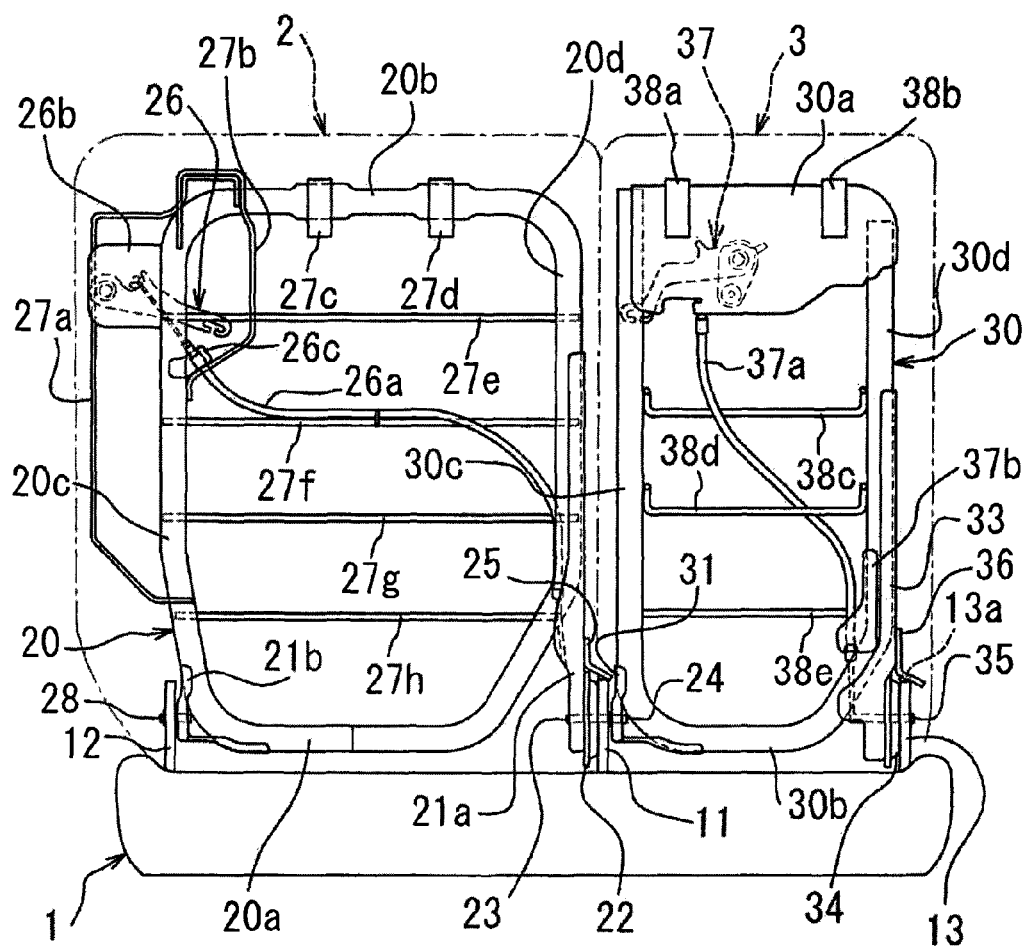
FIG. 1 is a schematic front view mainly illustrating a frame structure of a vehicle seat according to an embodiment of the present invention.

An embodiment of a vehicle seat according to the present invention will be discussed hereinafter with reference to the drawings. Referring to FIG. 1, there are mainly illustrated frame structures for first and second seat backs 2, 3 of a vehicle seat, the vehicle seat including a single seat cushion 1 and the first and second seat backs 2, 3 being separated in a vehicle width direction and supported to the seat cushion 1.

In the vehicle seat, the first seat back 2, namely, a seat back arranged at the right side on the basis of a sitting orientation of an occupant on the vehicle seat is configured as a seat back having a relatively wide width measured in the vehicle width direction, and the second seat back 3, namely, a seat back arranged at the left side on the basis of the sitting orientation of the occupant is configured as a sub seat back having a relatively narrow width measured in the vehicle width direction. Incidentally, the expression "right and left" referred to hereinafter means "right and left" on the basis of "the sitting orientation of the occupant".

The first seat back 2 includes a main frame 20 which is formed by causing a pipe-shaped material to be bent to a substantially quadrilateral-shape. The main frame 20 is provided at a left vertical section 20d thereof with a bracket 21a. A first recliner device 22 is arranged interposedly between the bracket 21a and a central bracket 11 rising up from the seat cushion 1.

The first recliner device 22 includes an actuating shaft 23 which is penetrated through the bracket 21a of the first seat back 2 and the central bracket 11 of the seat cushion 1 and rotatably supported to them. The central bracket 11 of the seat cushion 1 is provided with a support pin 24 which coaxially surrounds an axial end portion of the actuating shaft 23 that is penetrated through the central bracket 11 of the seat cushion 1, and which is projected toward the second seat back 3 from the central bracket 11 of the seat cushion 1.

Figure 2:
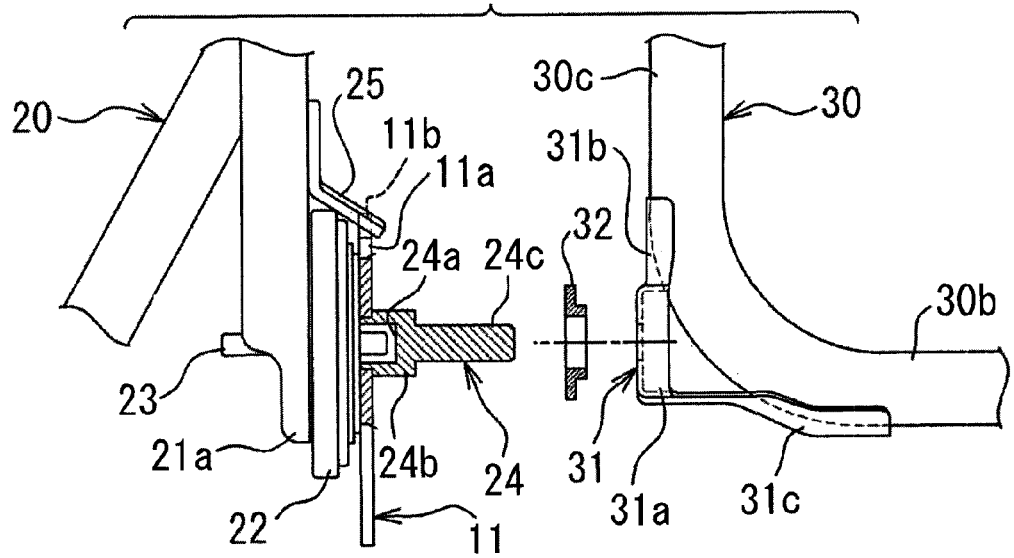
FIG. 2 is a schematic fragmentary and exploded front view illustrating a part of the frame structure of FIG. 1 which includes a support pin.

As the support pin, there is employed a support pin 24 including a large diameter root portion 24b having a spot-facing hole 24a for receiving the axial end portion of the actuating shaft 23 which is projected laterally from the first recliner device 22, as shown in FIG. 2. The support pin 24 is attached to the central bracket 11 of the seat cushion 1 with the spot-facing hole 24a thereof receiving the axial end portion of the actuating shaft 23 so as to allow the actuating shaft 23 to be rotatable, by fixing the root portion 24b onto the central bracket 11 of the seat cushion by caulking or welding.

Figure 3:
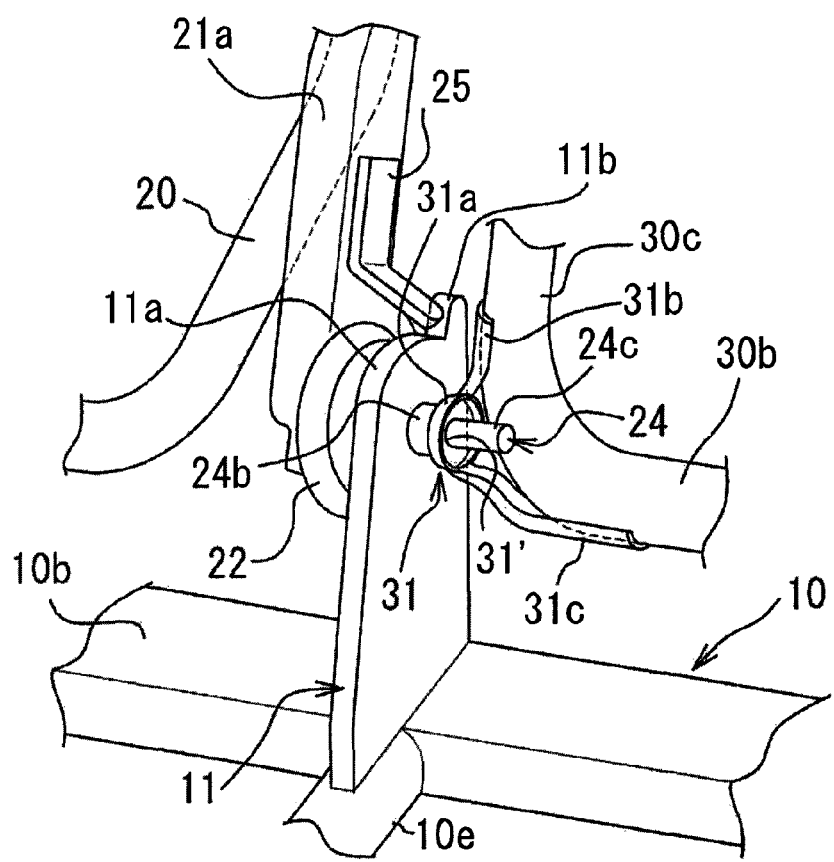
FIG. 3 is a schematic perspective view illustrating the part of the frame structure which includes the support pin shown in FIG. 2.

As clearly shown in FIG. 3, a stopper portion 11b is provided at the central bracket 11 of the seat cushion 1 so as to rise up from a rear region of an upper surface 11a of the central bracket 11, and an abutment piece 25 is provided at the bracket 21a of the first seat back 2 so as to laterally project in an oblique downward direction from the bracket 21a of the first seat back 2. When the first seat back 2 is pivoted rearward with respect to the seat cushion 1, the abutment piece 25 is adapted to be abutted against the stopper portion 11b of the central bracket 11 of the seat cushion 1, whereby a standing-up posture of the first seat back 2 is restricted.

In FIG. 1, a reference numeral 26 denotes an operation lever for causing the first recliner device 22 to be unlocked, a reference numeral 26a designates a cable wire coupling the actuating shaft 23 of the first recliner device 22 and the operation lever 26, a reference numeral 26b denotes an installation plate for the operation lever 26, and a reference numeral 26c denotes an engagingly stopping piece on which a cable end of the cable wire 26a is engagingly hooked. Incidentally, a wire end of the cable wire 26a which is adjacent the first recliner device 22 is connected to a tensioning piece (not shown) which is mounted on the axial portion of the actuating shaft 23 of the first recliner device 22.

Moreover, in FIG. 1, a reference numeral 27a and a reference numeral 27b denote a wire frame supporting the installation plate 26b for the cable wire 26a and a wire frame supporting the engagingly stopping piece 26c, respectively, reference numerals 27c, 27d denote holders attached to an upper section 20b of the main frame 20 for stays of a head rest of the first seat back 2, and reference numerals 27e, 27f, 27g, 27h denote support wires bridged between vertical sections 20c, 20d of the main frame 20 for supporting a cushioned padding of the first seat back 2.

A bracket 21b which forms a counterpart to the bracket 21a of the main frame 20 is provided at a lower region of the right vertical section 20c of the main frame 20. The bracket 21b is supported through a connection/support pin 28 to a bracket 12 rising up from the seat cushion 1 at a right side of the seat cushion 1. Thus, when the first recliner device 22 arranged on one of both sides of the first seat back 2 is unlocked by operating the operation lever 26, the first seat back 2 is brought to a condition where it can be pivoted around the connection/support pin 28 in a forward/rearward direction with respect to the seat cushion 1.

The second seat back 3 includes a main frame 30 which is formed by causing a pan frame 30a to be fixed to a substantially U-shaped pipe member so as to be bridged between upper end portions of the substantially U-shaped pipe member. The main frame 30 is provided, at a lower region of a right vertical section 30c thereof adjacent the first seat back 2, with a bracket 31 through which the support pin 24 is penetrated.

Referring now to FIG. 3, the bracket 31 includes a substantially cup-shaped support portion 31a having a through-hole 31' through which an axial portion 24c of the support pin 24 is penetrated, and an upper arm portion 31b and a lower arm portion 31c which extend radially from the cup-shaped support portion 31a. The bracket 31 is arranged at a right lower corner of the main frame 30 and fixed to the main frame 30 in such a manner that the upper arm portion 31b and the lower arm portion 31c extend along the right vertical section 30c of the main frame 30 and a lower section 30b of the main frame 30, respectively. More particularly, the bracket 31 is arranged in such a manner that the support portion 31a thereof faces the root portion 24b of the support pin 24 through a bush 32 (see FIG. 2) mounted around the axial portion 24c of the support pin 24. The second seat back 3 is pivotally supported to the central bracket 11 of the seat cushion 1 through the bracket 31 by the support pin 24, without provision of any recliner device between the bracket 31 of the second seat back 3 and the central bracket 11 of the seat cushion 1.

As shown in FIG. 1, the main frame 30 is provided at a left vertical section 30d thereof with a bracket 33 which forms a counterpart to the bracket 31 which has been discussed above. A second recliner device 34 is provided interposedly between the bracket 33 and a bracket 13 rising up from the seat cushion 1 at a left side of the seat cushion 1.

The second recliner device 34 also includes an actuating shaft 35 which is rotatably supported to the bracket 33 and the bracket 13. Like the first seat back 2, restricting means for restricting a standing-up posture of the second seat back 3 is provided with respect to the second seat back. As shown in FIG. 1, the restricting means includes a stopper portion 13a rising up from a rear region of an upper surface of the left bracket 13 of the seat cushion 1, and an abutment piece 36 laterally projecting in an oblique downward direction from the left bracket 33 of the main frame 30. When the second seat back 3 is pivoted rearward in the same manner as the first seat back 2 is done, the abutment piece 36 is abutted against the stopper portion 13a of the left bracket 13 of the seat cushion 1, whereby the standing-up posture of the second seat back 3 is restricted.

In FIG. 1, a reference numeral 37 designates an operation lever installed on the pan frame 30a for causing the second recliner device 34 to be unlocked, a reference numeral 37a denotes a cable wire coupling the actuating shaft 35 of the second recliner device 34 and the operation lever 37, a reference numeral 37b designates an engagingly stopping piece on which a cable end of the cable wire 37a is engagingly hooked, reference numerals 38a, 38b designate holders provided at the pan frame 30a for stays of a headrest of the second seat back 3, and reference numerals 38c, 38d, 38e denote support wires bridged between the vertical sections 30c, 30d of the main frame 30 for supporting a cushioned padding of the second seat back 3.

The second seat back 3 is supported by the second recliner device 34 arranged at one of both sides of the second seat back 3 and by the support pin 24 projected laterally from the central bracket 11 of the seat cushion 1. When the operation lever 37 is operated, to thereby cause the second recliner device 34 to be unlocked, the second seat back 3 is brought to a condition where the second seat back 3 is allowed to be pivoted in the forward/rearward direction with respect to the seat cushion 1. Therefore, regarding the second seat back 3, an additional recliner device except the second recliner device 34 can be omitted, so that an installment space for the additional recliner device is not required and, correspondingly, an effective sitting-space for the occupant in the second seat back 3 can be obtained in a vehicle width direction, and weight-lightening of the entire seat can be realized.

Without the provision of the additional recliner device except the second recliner device 34, the second seat back 3 is supported, at the other side thereof, to the support pin 24 penetrated through the bracket 31 of the second seat back 3, so that the second seat back 3 can be configured so as to be brought to a condition where it is allowed to be stably pivoted, by the second recliner device 34 only.

Figure 4:
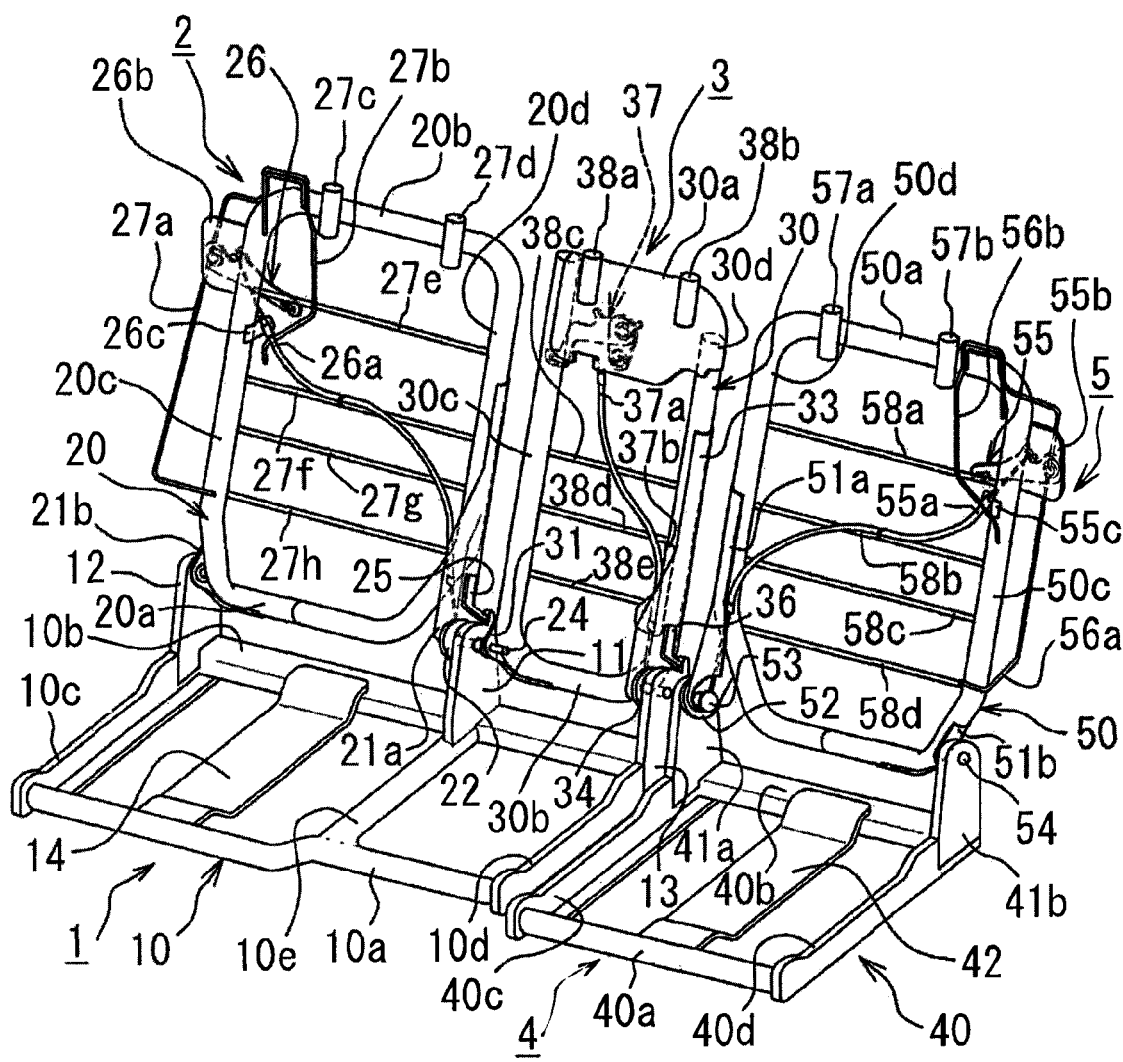
FIG. 4 is a schematic perspective view of a three-passenger seat including the vehicle seat of FIG. 1 and a single passenger seat which are arranged side by side.

The present invention can be applied to a three-passenger seat shown in FIG. 4. Referring now to FIG. 4, the three-passenger seat includes the seat cushion 1, the first seat back 2, the second seat back 3, and a single passenger seat arranged adjacent one of both sides of the two-passenger seat, the second seat back 2 being located between the first seat back 2 and a seat back 5 of the single passenger seat. In the illustrated example, the single passenger seat and the two-passenger seat including the seat cushion 1 and the first and second seat backs 2, 3 are configured so as to be independently slidable in a forward/rearward direction through slide rail mechanisms (not shown).

A main frame 10 of the seat cushion 1 to which the first and second seat backs 2, 3 are pivotally supported is formed in a substantially quadrilateral-shape extending laterally and includes forward and rearward frame sections 10a, 10b which are formed from pipe-shaped materials, and left and right frame sections 10c, 10d which are formed from angled frame-shaped materials. At a portion of the main frame 10 of the seat cushion 1 which positionally corresponds to a boundary between the first and second seat backs 2, 3, an intermediate frame section 10e which is formed from a pipe-shaped material is provided so as to be bridged between the forward and rearward frame sections 10a, 10b of the main frame 10.

In the structure of the main frame 10 of the seat cushion 1, a section of the main frame 10 to which the first seat back 2 is pivotally supported is provided with a pan frame 14 bridged between the forward and rearward frame sections 10a, 10b for receiving and supporting a cushioned padding of the seat cushion 1. Moreover, the brackets 12, 13 of the seat cushion 1 which have been discussed above are provided so as to rise up in an oblique rearward direction from both ends of the rearward frame section 10b. The central bracket 11 of the seat cushion 1 which has be discussed above is provided so as to also rise up in the oblique rearward direction from a rear end of the intermediate frame section 10e and a substantially central portion of the rearward frame section 10b.

The single passenger seat includes a seat cushion 4 and the seat back 5. The seat cushion 4 and the seat back 5 have a frame structure substantially corresponding to that of a section of the main frame 10 of the seat cushion 1 which supports the first seat back 2, and a frame structure substantially corresponding to that of the main frame 20 of the first seat back 2, respectively. More particularly, the seat cushion 4 includes a main frame 40 formed in a substantially quadrilateral-shape. The main frame 40 includes forward and rearward frame sections 40a, 40b formed from pipe-shaped materials, and left and right side frame sections 40c, 40d formed from angled frame-shaped materials.

In the main frame 40 of the seat cushion 4, brackets 41a, 41b are provided so as to rise up in the oblique rearward direction from both ends of the rearward frame section 40b. Moreover, a pan frame 42 for receiving and supporting a cushioned padding of the seat cushion 4 is provided so as to be bridged between the forward and rearward frame sections 40a, 40b.

The seat back 5 is configured so as to have the frame structure formed in the same manner as the main frame structure of the first seat back 2 is done. A bracket 51a is provided at a right vertical section 50d of a main frame 50 serving as a base of the seat back 5. A third recliner device 52 is arranged interposedly between the bracket 51a and the bracket 41a of the seat cushion 4. An actuating shaft 53 of this recliner device 52 is rotatably supported to the brackets 51b, 41b.

A bracket 51b which forms a counterpart to the bracket 51a is provided at a lower region of a left vertical frame section 50c of the main frame 50 of the seat back 5, and supported, via a connection/support pin 54, to the bracket 41b rising up from the seat cushion 4. The seat back 5 of the single passenger seat is configured so as to be pivotable around the connection/support pin 54 through the third recliner device 52 arranged on one of both sides of the signal passenger seat.

In FIG. 4, a reference numeral 55 denotes an operation lever for causing the third recliner device 52 to be unlocked, a reference numeral 55a designates a cable wire coupling the actuating shaft 53 of the third recliner device 52 and the operation lever 55, a reference numeral 55b denotes an installment plate for the operation lever 55, a reference numeral 55c designates an engagingly stopping piece on which a cable end of the cable wire 55a is engagingly hooked, a reference numeral 56a and a reference numeral 56b denote a wire frame for supporting the installment plate 55b and a wire frame for supporting the engagingly stopping piece 55c, respectively, reference numerals 57a, 57b designate holders provided at an upper frame section 50a of the main frame 50 for stays of a headrest of the seat back 5, and reference numerals 58a, 58b, 58c, 58d denote support wires stretched between the right and left vertical frame sections 50d, 50c of the main frame 50 for supporting a cushioned padding of the seat back 5.

In the three-passenger seat, the third recliner 52 for the single passenger seat is arranged adjacent the one of the both sides of the second seat back 3 and the first recliner device 22 for the first seat back 2 is arranged adjacent the other of the both sides of the second seat back 3, so that strength of the entire three-passenger seat can be enhanced. In a case where the three-passenger seat is employed in a vehicle in which a baggage compartment is provided behind the three-passenger seat, even if weight-load of baggage and/or luggage accumulated in the baggage compartment is applied to the three-passenger seat, the weight-load can be received by the second seat back 3 which is situated in a central position.

In the embodiment of the present invention which has been discussed above, the first seat back 2 is provided at the side thereof with the recliner device 22, the second seat back 3 is provided at the side thereof with the recliner device 34, the seat back 5 of the single passenger seat is provided at the side thereof with the recliner device 52, and the first seat back 2, the second seat back 3, and the seat back 5 of the single passenger seat are configured so as to be independently pivotable forward and rearward through the recliner device 22, the recliner device 34, and the recliner device 52, respectively. However, recliner devices may be provided at the both sides of the first seat back 2 and at the both sides of the seat back 5 of the single passenger seat. In this case, the recliner devices may be connected to each other by connecting shafts.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

What is claimed is:

1. A vehicle seat comprising:
   a seat cushion;
   first and second seat backs separated from each other in a vehicle width direction and pivotally supported to said seat cushion;
   said first seat back being provided at a side thereof adjacent a side of said second seat back with a first bracket;
   said second seat back being provided at the side thereof with a second bracket;
   said seat cushion being provided with a third bracket which is located between said first bracket of said first seat back and said second bracket of said second seat back and rises up from a rear end portion of said seat cushion;
   a first recliner device for allowing said first seat back to be pivoted in a forward/rearward direction with respect to said seat cushion;
   said first recliner device including an actuating shaft;
   said first recliner device being arranged interposedly between said first bracket of said first seat back and said third bracket of said seat cushion with said actuating shaft having a first end portion being penetrated through said first bracket and a second end portion penetrated through said third bracket, whereby said actuating shaft is rotatably supported to said first and third brackets;
   said third bracket of said seat cushion being provided with a support pin;
   said support pin being provided at said third bracket so as to be laterally projected toward said second seat back from said third bracket and coaxially surrounding the second end portion of said actuating shaft;
   said support pin being penetrated through said second bracket of said second seat back and supported to said second bracket; and
   a second recliner device for allowing said second seat back to be pivoted in the forward/rearward direction with respect to said seat cushion;
   said second recliner device being provided at a side of said second seat back which is remote from said first seat back.

2. A vehicle seat according to claim 1, wherein said third bracket of said seat cushion has a stopper portion rising up from a rear region of an upper surface thereof and said first bracket of said first seat back has an abutment piece projecting laterally therefrom, so that when said first seat back is pivoted rearward, said abutment piece is abutted against said stopper portion.

3. A vehicle seat according to claim 1, wherein said support pin has a large diameter root portion and a hole formed in said large diameter root portion, the second end portion of said actuating shaft of said first recliner device being rotatably received in said hole.

4. A vehicle seat according to claim 1, wherein said second seat back has a main frame which includes a pair of vertical frame sections and a lower frame section connected between lower end portions of said vertical frame sections, and said second bracket of said second seat back includes a support portion having a hole through which said support pin is inserted, and arm portions extending from said support portion and fixed to one of said vertical frame sections and said lower frame section.

* * * * *